United States Patent [19]

Blahak et al.

[11] Patent Number: 4,631,319
[45] Date of Patent: Dec. 23, 1986

[54] THERMOSETTING CYANATE RESIN AND THE USE THEREOF FOR THE PRODUCTION OF COMPOSITE MATERIALS AND IPNS

[75] Inventors: Johannes Blahak; Rolf Dhein, both of Krefeld; Lothar Preis, Bergisch-Gladbach; Manfred Schreckenberg, Krefeld, all of Fed. Rep. of Germany

[73] Assignee: Bayer Aktiengesellschaft, Leverkusen, Fed. Rep. of Germany

[21] Appl. No.: 718,800

[22] Filed: Apr. 1, 1985

[30] Foreign Application Priority Data

Apr. 11, 1984 [DE] Fed. Rep. of Germany ....... 3413547

[51] Int. Cl.$^4$ .................... C08L 67/02; C08G 63/18
[52] U.S. Cl. .................... 525/437; 528/288; 525/32.1; 525/445; 525/447
[58] Field of Search ................. 528/288; 525/437, 447

[56] References Cited

U.S. PATENT DOCUMENTS 4,330,669 5/1982 Ikeguchi .............................. 528/289

Primary Examiner—John C. Bleutge
Assistant Examiner—Patricia Short
Attorney, Agent, or Firm—Connolly and Hutz

[57] ABSTRACT

This invention relates to a thermosetting resin of either (a) at least one polycyanate and (b) at least one polyester polyol or of (c) a prepolymer of (a) and (b) and to the use thereof for the production of composite materials and of interpenetrating polymer networks (IPNs).

7 Claims, No Drawings

THERMOSETTING CYANATE RESIN AND THE USE THEREOF FOR THE PRODUCTION OF COMPOSITE MATERIALS AND IPNS

This invention relates to a thermosetting resin of either (a) at least one polycyanate and (b) at least one polyester polyol or of (c) a prepolymer of (a) and (b) and to the use thereof for the production of composite materials and of interpenetrating polymer networks (IPNs).

High-performance composite materials based on fibre-reinforced duromers are growing in importance. The breaking elongation of modern reinforcing fibres, for example carbon fibres, may be as high as 2% and it is likely that reinforcing fibres having even greater breaking elongation will be available in the near future. To ensure that this breaking elongation may be fully utilized in the composite material, the breaking elongation of the matrix consisting of the duromer has to be increased, without significantly affecting dimensional stability under heat, to such an extent that it equals or exceeds the breaking elongation of the reinforcing fibres, i.e. matrices having breaking elongations of at least 2%, preferably of at least 4%, more preferably at least 6%, have to be made available.

Accordingly, an object of the present invention is to provide temperature-stable duromers characterized by high breaking elongation.

It has surprisingly been found that this object may be achieved by the addition of low molecular weight polyesters containing cycloaliphatic radicals to a polycyanate and then curing the polyester and polycyanate together.

Accordingly, the present invention relates to a thermosetting resin containing:

(a) at least one polycyanate and
(b) from 1 to 40%, by weight, preferably from 5 to 20%, by weight, based on (a), of at least one polyester having a hydroxyl number of from 28 to 320, preferably from 28 to 140, and a number average molecular weight $M_n$ of from 700 to 8000, preferably from 800 to 4000; and/or (c) a prepolymer of (a) and (b); characterized in that the polyester (b) contains from 50 to 92%, by weight, preferably from 75 to 89%, by weight, of alcohol and/or acid residues containing cycloaliphatic structures.

Preferred polycyanates (a) correspond to the following general formula:

$$R(O-C \equiv N)_n \quad (1)$$

wherein n represents an integer equal to or greater than 2, preferably equal to 2; and R represents an n-functional aromatic radical optionally connected by one or more bridge members. The aromatic radicals R contain at least 6 carbon atoms, preferably from 6 to 12 carbon atoms. Particularly preferred radicals R are, for example, phenylene, naphthylene, anthrylene and diphenylene.

The aromatic radical R which may be interrupted by one or more bridge members generally contains at least 12 carbon atoms, preferably from 12 to 16 carbon atoms. It is made up of aromatic radicals containing at least 6 carbon atoms, preferably 6 carbon atoms. The bridge members may be atoms or atomic groups, such as

 (2)

 (3)

 (4)

 (5)

 (6)

 (7)

 (8)

wherein
$R_1$ and $R_2$, which may be the same or different, represent hydrogen or alkyl radicals containing from 1 to 4 carbon atoms; and n represents an integer of from 1 to 6; a cyclopentane or cyclohexane residue optionally substituted one or more times by alkyl groups containing from 1 to 4 carbon atoms;

 (9)

 (10)

wherein
X represents O, NH, NR' (R' represents an alkyl radical containing from 1 to 4 carbon atoms); and R represents a hydrocarbon residue and, particularly when X represents O, represents a residue of an oligo- or poly-glycol, a polyether, polyester or polyurethane and, when X represents NH or NR', represents a residue of a polyamine, polyamide or polyurea; the bridge member

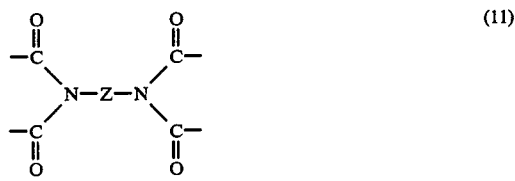 (11)

wherein Z represents, for example, $(-CH_2-)_{2-6}$; (12)

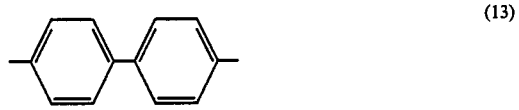 (13)

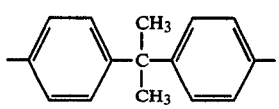 (14)

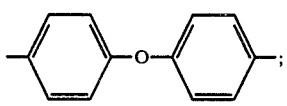 (15)

in addition, the bridge member also represents residues, such as

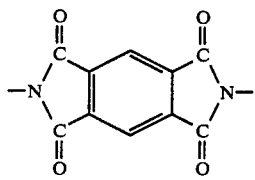 (16)

or

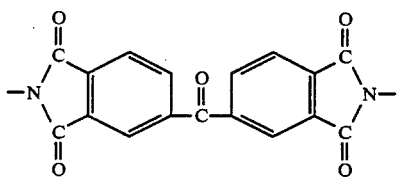 (17)

The aromatic radicals may additionally carry one or more substituents, such as alkyl groups containing from 1 to 6 carbon atoms, cycloalkyl groups containing from 5 to 7 carbon atoms, aralkyl groups containing from 7 to 12 carbon atoms, such as benzyl or phenyl ethyl, aryl groups containing from 6 to 16 carbon atoms, such as phenyl or naphthyl, alkoxy groups containing from 1 to 6 carbon atoms in the alkyl portion, halogen, such as chlorine, bromine or fluorine, nitro groups, carboxylic acid ester, carboxylic acid amide, carboxylic acid nitrile or sulphonic acid ester groups. Aromatic cyanic acid esters containing unsubstituted aromatic neuclei are preferably used.

Mixtures of the cyanic acid esters may also be used.

The following aromatic cyanic acid esters are specifically mentioned: m- or p-phenylene-bis-cyanate, 1,3,5-tricyanatobenzene, 1,3-, 1,4-, 1,5-, 1,6-, 1,7-, 1,8-, 2,6-, 2,7-dicyanatonaphthalene, 1,3,6-tricyanatonaphthalene, 4,4'-dicyanatodiphenyl, 2,2'-dicyanato-(1,1')-dinaphthyl, 1-methyl-1,4-dicyanatobenzene, 2-chloro-1,4-dicyanatobenzene, 2,3-dicyano-1,4-dicyanatobenzene, 4-chloro-1,3-dicyanatobenzene, 4-acetyl-1,3-dicyanatobenzene, 2-nitro-1,3-dicyanatobenzene, 3,5,3',5'-tetrachloro-2,2'-dicyanatodiphenyl, also poly-cyanatoquinones, such as 1,4-dicyanatonaphthoquinone, 1,4- or 1,5-dicyanatoanthraquinone, and also poly-cyanato compounds of which the aromatic radicals carrying the cyanate group are attached by bridge members, such as 2,2'- or 3,3'- or 4,4'-dicyanatodiphenylmethane; 4,4'-dicyanato-(1,1)- or -(1,2)-diphenylethane; 2,2-bis-(4-cyanatophenyl)-propane; 2,4-bis-(4-cyanatophenyl)-2-methyl pentane; 1,1-bis-(4-cyanatophenyl)-cyclohexane; 4,4',4''-tricyanatotriphenylmethane; 4,4'-dicyanatodiphenyl ether; 4,4'-dicyanatodiphenyl sulphide; 4,4'-dicyanatodiphenyl sulphone, 4,4'-dicyanatodibenzyl ether; 4,4'-dicyanatodibenzyl thioether; 2,2'-dicyanato-3,5,3',5'-tetramethyl dibenzyl ether; 4,4'-dicyanatobenzophenone, 2,2-bis-(4-cyanato-3,5-dichlorophenyl)-propane; and tri-(4-cyanatophenyl)-phosphate.

Also suitable are the polycyanic acid esters obtainable from chemically unclearly defined condensation products of phenols and aldehydes, particularly formaldehyde, for example novolaks or phenol-modified xylene/formaldehyde resins, by reaction with cyanogen halide in the presence of a base (cf. DE-PS No. 1,251,023). It is also possible to use the poly-cyanic acid esters which are derived from the poly-phenols corresponding to the following general formula which may be obtained therefrom by reaction with cyanogen halide in the presence of base:

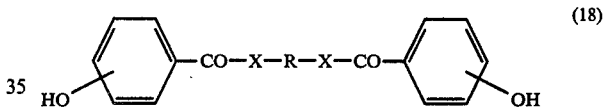 (18)

In this formula, X represents O or NH or NR'; R represents a hydrocarbon residue and, when X represent O, represents residue of an oligo- or poly-glycol, a polyether, polyester or polyurethane, and, when X represents NH or NR' represents the residue of a polyamine, polyamide or polyurea. R' is intended to represent an alkyl radical.

Other suitable cyanic acid esters are:

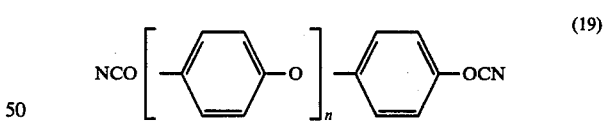 (19)

n=2 or 6

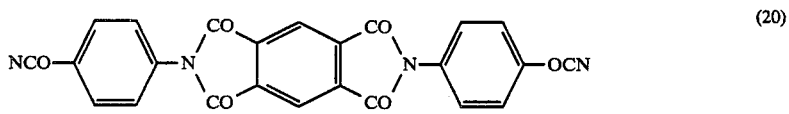 (20)

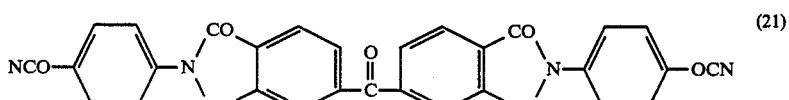 (21)

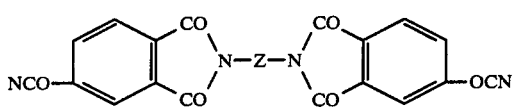
(22)

wherein Z represents, for example, $(CH_2)_{2-6}$

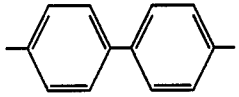 (23)

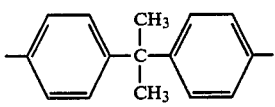 (24)

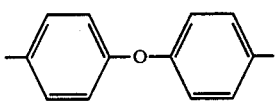 (25)

Of particular interest for the production of hydrophobic matrices is the use of fluorinated cyanates, for example those corresponding to the following general formula:

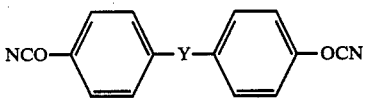 (26)

wherein Y represents perfluorinated $C_1$–$C_{10}$ alkylene, preferably —$CF_2$—, —$CF_2$—$CF_2$— and

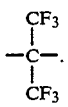

The most preferred polycyanate is 2.2-bis-(4-cyanatophenyl)-propane.

Preferred polyesters (b) are, for example, polycondensates based on polyols and, optionally, monohydric alcohols, on polycarboxylic acids and optionally monobasic carboxylic acids and/or on hydroxycarboxylic acids. They preferably contain hydroxyl and/or carboxyl groups and, in some cases, even cyanate, isocyanate, acryloyl or methacryloyl groups as terminal groups.

Particularly suitable polycarboxylic acids for producing the polyesters (b) are those corresponding to the following general formula:

$$A(\text{—COOH})_x \qquad (27)$$

wherein A represents a bond when x represents (2) or an x-functional, optionally substituted aliphatic radical preferably containing from 1 to 20 carbon atoms, a cycloaliphatic radical preferably containing from 5 to 16 carbon atoms, an aliphatic-aromatic radical preferably containing from 7 to 20 carbon atoms, an aromatic radical preferably containing from 6 to 15 carbon atoms or an aromatic or cycloaliphatic $C_2$–$C_{12}$ radical containing heteroatoms, such as N, O or S, in the ring, and x represents an integer of from 2 to 4, preferably 2 or 3.

Preferred examples of such polycarboxylic acids are oxalic acid, malonic acid, succinic acid, glutaric acid, adipic acid, trimethyl adipic acid, azelaic acid, sebacic acid, decane dicarboxylic acid, dodecane dicarboxylic acid, fumaric acid, maleic acid, hexahydroterephthalic acid, phthalic acid, isophthalic acid, terephthalic acid, benzene-1,3,5-tricarboxylic acid, benzene-1,2,4-tricarboxylic acid, benzene-1,2,3-tricarboxylic acid, naphthalene-1,5-dicarboxylic acid, benzophenone-4,4'-dicarboxylic acid, diphenylsulphone-4,4'-dicarboxylic acid, butane tetracarboxylic acid, tricarballylic acid, ethylene tetracarboxylic acid, pyromellitic acid, benzene-1,2,3,4-tetracarboxylic acid, benzene-1,2,3,5-tetracarboxylic acid and also

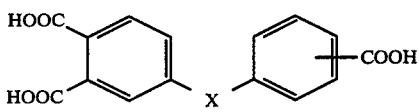

and

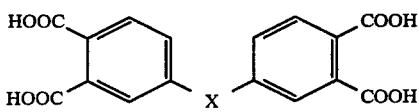

wherein X represents

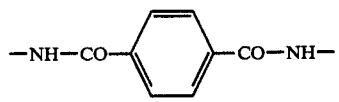

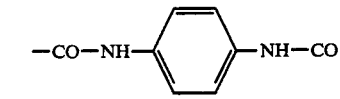

—O—, —S—, —$SO_2$—, —CO—, —N=N—,

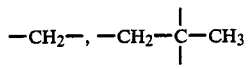

Preferred hydroxycarboxylic acids are those corresponding to the following general formula:

$$(\text{HOOC—})_y A(\text{—OH})_z \qquad (28)$$

wherein A is as defined above; and y and z independently represent an integer of from 1 to 3, preferably 1 or 2.

Preferred examples are glycolic acid, lactic acid, mandelic acid, malic acid, citric acid, tartaric acid, 2-, 3- and 4-hydroxybenzoic acid and also hydroxybenzene dicarboxylic acids.

Polyols suitable for use in the production of the polyester polycarboxylic acids are, in particular, those corresponding to the following general formula:

$$B(-OH)_a \qquad (29)$$

wherein B represents an a-functional aliphatic radical containing from 2 to 20 carbon atoms, a cycloaliphatic radical containing from 5 to 16 carbon atoms, an araliphatic radical containing from 7 to 20 carbon atoms, an aromatic radical containing from 6 to 15 carbon atoms and a $C_2$–$C_{12}$ heterocyclic radical containing N, O or S; and a represents an integer of from 2 to 6, preferably 2 or 3.

Preferred examples of such polyols are ethylene glycol, 1,2- and 1,3-propane diol, 1,2-, 1,3-, 1,4- and 2,3-butane diol, 1,5-pentane diol, 2,2-dimethyl-1,3-propane diol, 1,6- and 2,5-hexane diol, 1,12-dodecane diol, 1,12- and 1,18-octadecane diol, 2,2,4- and 2,4,4-trimethyl-1,6-hexane diol, trimethylol propane, trimethylol ethane, glycerol, 1,2,6-hexane triol, pentaerythritol, mannitol, 1,4-bis-hydroxymethyl cyclohexane, cyclohexane-1,4-diol, 2,2-bis-(4-hydroxycyclohexyl)-propane, bis-(4-hydroxyphenyl)-methane, bis-(4-hydroxyphenyl)-sulphone, 1,4-bis-(hydroxymethyl)-benzene, 1,4-dihydroxybenzene, 2,2-bis-(4-hydroxyphenyl)-propane, 1,4-bis-($\beta$-hydroxyethoxy)-benzene, 1,3-bis-hydroxyalkyl hydantoins, tris-hydroxyalkyl isocyanurates and tris-hydroxyalkyl-triazolidane-3,5-diones.

Other polyols suitable for use in the production of the polyester polycarboxylic acids are the hydroxyalkyl ethers obtained by the addition of optionally substituted alkylene oxides, such as ethylene oxide, propylene oxide butylene oxide and styrene oxide, onto the above-mentioned polyols and corresponding to the following general formula:

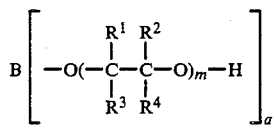

wherein
B and a are as defined above; m represents an integer of from 1 to 7; and
$R^1$, $R^2$, $R^3$ and $R^4$ independently represent hydrogen atoms, optionally halogen-substituted $C_1$–$C_{10}$ aliphatic radicals. $C_4$–$C_8$ cycloaliphatic radicals, $C_7$–$C_{17}$ araliphatic radicals or optionally halogen-, alkyl- and/or alkoxy-substituted $C_6$–$C_{16}$ aromatic radicals. $R^1$, $R^2$, $R_3$ and $R^4$ preferably represent hydrogen, alkyl radicals containing from 1 to 4 carbon atoms, preferably methyl or ethyl, or $C_6$–$C_{12}$ aryl radicals optionally substituted by halogen atoms (e.g. chlorine, bromine), $C_1$–$C_4$ alkyl radicals and/or by $C_1$–$C_4$ alkoxy groups, but especially phenyl.

Preferred examples of such polyols are diethylene glycol, triethylene glycol, dipropylene glycol, tripropylene glycol, dibutylene glycol, 1,4-bis-(2-hydroxyethoxy)cyclohexane, 1,4-bis-(2-hydroxyethoxy-methyl)-cyclohexane, 1,4-bis-(2-hydroxyethoxy)-benzene, 4,4'-bis-(2-hydroxyethoxy)-diphenylmethane, -2-diphenylpropane, -diphenyl ether, -diphenyl sulphone, -diphenyl ketone and -diphenyl cyclohexane.

The carboxylic acids or carboxylic acid derivatives used and the polyols used may, of course, also be oligomeric. Thus, it is possible to use, for example, aromatic dicarboxylic acid esters having the following structural formula:

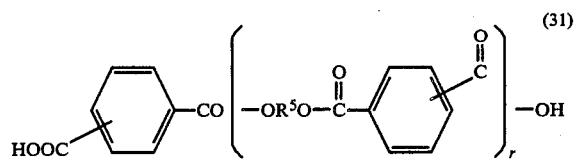

and aliphatic dicarboxylic acid esters having the following structure formula:

$$HOOC(-CH_2)_s-CO[OR^6-OOC(-CH_2)_r-CO]_{,OH} \qquad (32)$$

wherein
$R^5$ and $R^6$ independently represent an at least difunctional aromatic radical containing from 6 to 15 carbon atoms, an araliphatic radical containing from 7 to 20 carbon atoms, a saturated or unsaturated aliphatic radical containing from 2 to 20 carbon atoms, a cycloaliphatic radical containing from 5 to 15 carbon atoms, which, in each case, may be condensed with aromatic ($C_6$–$C_{12}$), cycloaliphatic ($C_4$–$C_{12}$) or heterocyclic ($C_2$–$C_{12}$) ring systems and may contain ether, keto, ester or sulpho bridges and is optionally substituted by halogen, nitro or alkoxy groups containing from 1 to 20 carbon atoms;
r represents an integer of from 1 to 20; and
s and t independently represent zero or an integer of from 1 to 20.

The following are preferred examples of $(R^5)_r$ and $(R^6)_r$:

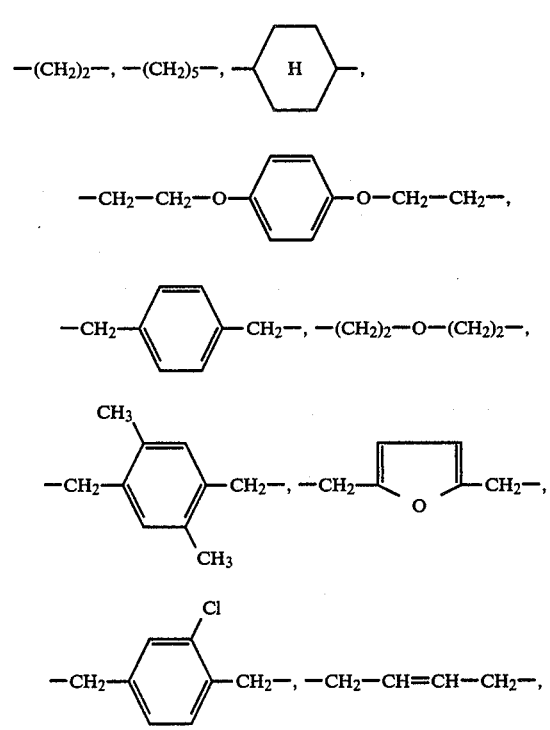

-continued

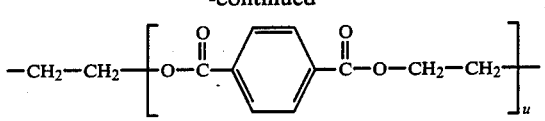

wherein u represents an integer of from 1 to 7.

The residues of alcohols and acids containing cycloaliphatic structures are to be understood to be the alcohols and acids, respectively, reduced by the hydrogen atoms of the alcoholic groups and by the hydroxyl radicals of the carboxyl groups. Particularly preferred alcohol and acid residues having cycloaliphatic structures are the dimerized fatty acid residue:

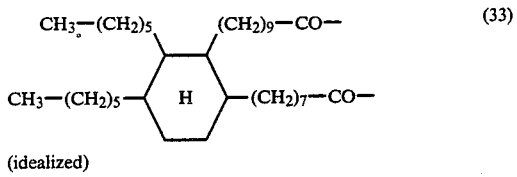

(idealized)

and the dimerized fatty alcohol residue

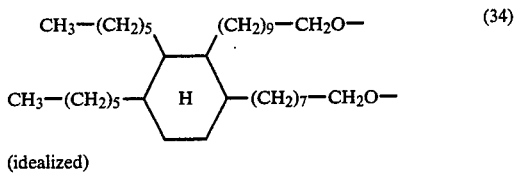

(idealized)

The most preferred polyol for producing the polyesters (b) is 1,6-hexane diol. Preferred polyesters (b) are described, for example, in DE-OS No. 2,942,680 and in US-PS No. 3,549,570.

The molecular weight of the polyesters (b) determined as the number average amounts to form 700 to 8000 (up to molecular weights of 5000, determined by vapour pressure osmometry in dioxane and acetone; in the event of differing values, the lower value is regarded as the correct value; molecular weights above 5000 determined by membrane osmometry in acetone).

Preferred prepolymers (c) of (a) and (b) have viscosities which enable the products to be cast, optionally after heating, i.e. viscosities of, for example, up to 10,000 mPa.s at 150° C. If it is desired to produce mouldings particularly resistant to high temperatures, compounds which, when homopolymerized, give high-temperature-resistant polymers (having softening points of at least 200° C., as measured by DTA), for example bis-imides of maleic acid anhydride and diaminoarylene (for example 4,4'-diaminodiphenylmethane), may be used in addition to components (a) and (b) or (c). These olefinically unsaturated, copolymerizable monomers may be used in quantities of from 5 to 95%, by weight, preferably from 20 to 70%, by weight, based on polycyanate.

A thermosetting resin according to the present invention may be converted into a cured resin showing outstanding thermal stability simply by heating. In general, however, catalysts are used to promote cross linking of the individual components of the resin composition. Preferred catalysts are imidazoles, such as 2-methyl imidazole, 2-undecyl imidazole, 2-heptadecyl imidazole, 2-phenyl imidazole, 2-ethyl-4-methyl imidazole, 1-benzyl-2-methyl imidazole, 1-propyl-2-methyl imidazole, 1-cyanoethyl-2-methyl imidazole, 1-cyanoethyl-2-ethyl-4-methyl imidazole, 1-cyanoethyl-2-undecyl imidazole, 1-cyanoethyl-2-phenyl imidazole, 1-guanaminoethyl-2-methyl imidazole and adducts of imidazole and trimellitic acid, tertiary amines, such as N,N-dimethylbenzylamine, N,N-dimethylaniline, N,N-dimethyltoluidine, N,N-dimethyl-p-anisidine, p-halogen-N,N-dimethylaniline, 2-N-ethylanilinoethanol, tri-n-butylamine, pyridine, quinoline, N-methyl morpholine, triethanolamine, triethylene diamine, N,N,N',N'-tetramethylbutane diamine, N-methyl piperidine, phenols, such as phenol, cresol, xylenol, resorcinol and phloroglucinol, organo metallic salts, such as lead naphthenate, lead stearate, zinc naphthenate, zinc octoate, tin oleate, dibutyl tin maleate, manganese napthenate, cobalt naphthenate and iron acetylacetonate, inorganic metal salts, such as tin-(IV) chloride, zinc chloride and aluminium chloride, peroxides, such as benzoyl peroxide, lauroyl peroxide, octanoyl peroxide, acetyl peroxide, p-chlorobenzoyl peroxide and di-t-butyl diperphthalate, acid anhydrides, such as maleic acid anhydride, phthalic acid anhydride, aluric acid anhydride, pyromellitic acid anhydride, trimellitic acid anhydride, hexahydronaphthalene acid anhydride, hexahydropyromellitic acid anhydride and hexahydrotrimelitic acid anhydride, azo compounds, such as azoisobutyronitrile, 2,2'-azo-bis-propane or m,m'-azoxystyrene, and/or hydrazones and hydrozones.

Catalysts of the type used for curing epoxy resins are also suitable for curing the resins according to the present invention.

The resins according to the present invention may be processed with various known fibres, woven fabrics (including blends) produced therefrom, non-wovens and honeycomb structures to form composite materials. Particularly preferred fibres are glass fibres, aramid fibres and carbon fibres.

The fibre content of the composite materials generally amounts to from 10 to 80%, by weight preferably from 30 to 70%, by weight, based on the sum of cured resin and fibres.

The present invention also relates to the use of the present thermosetting resins for the production of composite materials.

So-called prepregs may, of course, be produced from the resins according to the present invention and reinforcing fibres by conversion from the uncured "A-stage" into a prepolymerized "B-stage" and may be polymerized to completion any time after moulding.

Generally, the resins according to the present invention may be cured at temperatures of from 160° to 250° C., preferably from 200° to 230° C.

By virtue of the high thermal stability thereof, the composite materials may be used for various applications where particular emphasis is placed on that property, for example for engine construction in the automotive and aeronautical industries and for temperature-resistant housing components for machines of all types.

The present invention also relates to the use of the defined thermosetting resins in the production of interpenetrating polymer networks (IPN's). IPN's and the production thereof from at least one thermoplast or a non-film-forming preliminary stage thereof and/or at least one curable resin or a preliminary stage thereof are known (cf. U.S. Pat. No. 4,041,103, U.S. Pat. No. 4,101,605, U.S. Pat. No. 4,157,360, U.S. Pat. No. 4,334,045, DE-OS Pat. No. 21 53 987).

The thermosetting resins according to the present invention may be used in admixture with at least one thermoplast or a non-film-forming preliminary stage thereof and, optionally, thermosetting resins or components different from the thermosetting resins according to the present invention for the production of the IPN's.

The thermoplasts may optionally contain cyanate-reactive groups, for example aliphatic or phenolic hydroxyl groups, thiol groups, primary and/or secondary amino groups, carboxyl groups and others.

Examples of thermoplasts are polyolefins, such as polypropylene, aliphatic and aromatic polyamides, for example of adipic acid/1,6-hexamethylene diamine, polycaprolactam, terephthalic acid/phenylene diamines and others; polycarbonates, for example based on bisphenol A; polyesters, such as polyethylene terephthalate, polybutylene terephthalate, polystyrene, polyimides, polyurethanes or mixtures thereof.

The thermosetting resins according to the present invention and, optionally, other thermosetting components differing from the present resins, such as bismaleic imides, for example, are present in the mixtures for producing the IPN's in a total quantity of from 0.1 to 40%, by weight, preferably from 0.1 to 9%, by weight, so that the thermoplasts are correspondingly present in a quantity of from 60 to 99.9%, by weight, preferably from 91 to 99.9%, by weight, based on the sum of thermosetting resins and thermoplasts.

The resins according to the present in admixture with at least one thermoplast and, optionally, other thermosetting components differing from the present resins may be cured in the presence of the catalysts described with reference to the curing of the resins according to the present invention, preferably in quantities of from 0.01 to 5%, by weight, based on the sum of thermosetting resins and thermoplasts, at from 160° to 250° C., preferably from 200° to 230° C. For the production of composite materials, curing may be carried out in the presence of organic and/or inorganic fibres and filaments, non-wovens, woven fabrics etc. produced therefrom, the fibre content of the composite materials amounting to from 10 to 80%, by weight, preferably from 30 to 70%, by weight, based on the composite materials.

The thermosetting resins according to the present invention and mixtures thereof with thermoplasts and, optionally, other thermosetting components may, of course, also be cured in the presence of known fillers, such as carbon black, aluminium oxides, silicon carbide, silicas, metal powders etc., in the conventional quantities after forming by casting, extrusion, injection moulding etc. to form mouldings and coatings.

The properties of the cured mouldings in the following Examples were determined by the following standard methods:

| Tensile strength: | DIN 53 455 |
| Breaking elongation: | DIN 53 455 |
| Modulus of elasticity: | DIN 53 457 |
| Martens temperature: | DIN 53 458 |
| Vicat-B temperature: | DIN 57 302 |

EXAMPLE 1

225 g of 2,2-bis-(4-cyanatophenyl)-propane and 25 g of dimer fatty acid hexane diol-1.6 polyester (OH number 60, average molecular weight $\overline{M}_n$ 1870) were prepolymerized for 3 hours at 105° C. The prepolymer (free cyanate group content: 20.0%, by weight) was poured into a steel mould heated to 200° C. and cured for 4 hours at that temperature. Standard bars were produced from the 320×160×4 mm plate obtained and were found to have the following properties:

| Tensile strength | 91.51 ± 4.11 | (N/mm$^2$) |
| Breaking elongation | 5.22 ± 0.73 | (%) |
| E-modulus | 4740 ± 155 | (N/mm$^2$) |
| Martens temperature | 205 | (°C.) |
| Impact strength | 35.88 ± 3.11 | (kJ/m$^2$) |
| Notched impact strength | 1.38 ± 0.26 | (kJ/m$^2$) |

COMPARISON 1

The procedure was as in Example 1, except that no dimer fatty acid hexane diol-1.6 polyester was used. The breaking elongation of the cured polycyanate amounted to 1.5±0.28 (%).

COMPARISON 2

The procedure was as in Example 1, except that the dimer fatty acid hexane diol-1.6 polyester was replaced by 25 g of hexane diol-1.6 polycarbonate having an average molecular weight of 2000 and a hydroxyl number of 56. The breaking elongation amounted to 2.44±0.41 (%).

Comparison 2 shows that—although the molecular weights of the dimer fatty acid hexane diol-1.6 polyester of Example 1 and of the hexane diol-1.6 polycarbonate of Comparison 2 are of the same order of magnitude—the latter effects a considerably smaller improvement of the breaking elongation.

EXAMPLE 2

200 g of 2,2-bis-(4-cyanatophenyl)-propane and 50 g of dimer fatty acid hexane diol-1.6 polyester (OH number 112, average molecular weight $\overline{M}_n$ 1000) were prepolymerized for 1 hour at 105° C. The prepolymer had a free cyanate group content of about 19.5%, by weight. It was then poured into a steel mould heated to 200° C. and cured at this temperature for 3 hours. Standard bars produced from the plate had the following properties:

| Tensile strength | 76.31 ± 3.19 | (N/mm$^2$) |
| Breaking elongation | 6.1 ± 1.27 | (%) |
| E-modulus | 2270 ± 396 | (N/mm$^2$) |
| Martens temperature | 145 | (°C.) |
| Impact strength | 28.59 ± 9.27 | (kJ/m$^2$) |
| Notched impact strength | 1.90 ± 0.06 | (kJ/m$^2$) |

EXAMPLE 3

The procedure was as in Example 1, except that 225 g of 1,3-dicyanatobenzene was used as the polycyanate. The prepolymer had a free cyanate group content of 20.0%, by weight. The standard bars had the following properties:

| Tensile strength | 104.32 ± 5.23 | (N/mm$^2$) |
| Breaking elongation | 8.14 ± 1.37 | (%) |
| E-modulus | 3840 ± 132 | (N/mm$^2$) |
| Martens temperature | 194 | (°C.) |

EXAMPLE 4

The procedure was as in Example 1, except that 225 g of 2,2-bis-(4-cyanatophenyl)-hexafluoropropane was used as the polycyanate. The prepolymer had a free cyanate groups content of 20.0%, by weight. The standard bars had the following properties:

| Tensile strength | 108.52 ± 5.32 (N/mm$^2$) |
| --- | --- |
| Breaking elongation | 5.41 ± 0.80 (%) |
| E-modulus | 5230 ± 208 (N/mm$^2$) |
| Martens temperature | 216 (°C.) |
| Water absorption (6 days/25° C.) | 0.05 (%) |
| Tensile strength after storage in air (200° C./1000 h) | 105.32 ± 4.01 (N/mm$^2$) |

Similar values are obtained when 1,2-bis-(4-cyanatophenyl)-tetrafluoroethane is used.

EXAMPLE 5

178.92 g of 2,2-bis-(4-cyanatophenyl)-propane and 25 g of the dimer fatty acid hexane diol-1.6 polyester of Example 1 were stirred for 40 minutes at 125° C. 46.08 g of a bis-maleic imide produced from 4,4'-diaminodiphenylmethane and maleic acid anhydride were introduced in portions into the mixture heated to 135° C. The reaction mixture was then stirred for 1 hour at that temperature, degassed in a water jet vacuum and poured into a steel mould heated to 200° C. The standard bars produced had the following properties:

| Tensile strength | 58.95 ± 8.11 (N/mm$^2$) |
| --- | --- |
| Breaking elongation | 3.14 ± 0.63 (%) |
| E-modulus | 2932 ± 276 (N/mm$^2$) |

COMPARISON 3

The procedure was as in Example 5, except that no dimer fatty acid hexane diol-1.6 polyester was used. The breaking elongation of the standard bars obtained amounted to 1.26±0.31 (%).

EXAMPLE 6

20 parts, by weight, of the cyanate prepolymer according to Example 1 and 50 parts, by weight, of a mixture of 5 parts, by weight, of 2,2-bis-(4-cyanatophenyl)-propane and 45 parts, by weight, of a polycarbonate based on bis-phenol. A containing terminal phenolic groups and having an average molecular weight $\overline{M}_n$ of 2200 and also 50 parts, by weight, of an isotactic polypropylene having a melting point (MFI) of 9 g/10 mins at 230° C. under a load of 5 kg are extruded at 200° C. and cured at that temperature. A nailable and sawable polymer having a Vicat B temperature of 280° C. is obtained.

If the test described above is repeated without the 20 parts, by weight, of the cyanate prepolymer, a brittle inhomogeneous polymer having a Vicat B temperature of 134° C. is obtained.

EXAMPLE 7

50 parts, by weight, of the isotactic polypropylene according to Example 6 and 50 parts, by weight, of polycarbonate having an average molecular weight $\overline{M}_n$ of 28,000 are stirred at 240° C. An inhomogeneous, string-forming mass is obtained. 20 parts, by weight, of the cyanate prepolymer of Example 1 are added thereto, followed by extrusion (melt temperature 250° C.). After tempering of the strand (3 h at 200° C.), a wood-like, homogeneous composite material is obtained. It is nailable and sawable and has a Vicat B temperature of 280° C.

If the test described above is repeated without the cyanate prepolymer, the polymer mixture obtained is imhomogeneous and splits in the nail test. It has a Vicat B temperature of 124° C.

EXAMPLE 8

25 parts, by weight, of styrene and 25 parts, by weight, of polystyrene (average molecular weight $\overline{M}_n=2000$) containing terminal OH groups are stirred with 50 parts, by weight, of the cyanate prepolymer of Example 1 for 2.5 hours at 100° C. followed by slow heating for 2 hours to 200° C. in an oven. A hard IPN having a Martens temperature of 250° C. is obtained from the liquid preliminary stages.

EXAMPLE 9

50 parts, by weight, of polystyrene (average molecular weight $\overline{M}_n=28,000$) are stirred with 15 parts, by weight, of the cyanate prepolymer of Example 1 for 2.5 hours at 100° C. and then poured into a steel mould. After heating for 4 hours at 200° C., a rigid composite polymer is obtained from the pourable preliminary stage. Martens temperature: 265° C.

EXAMPLE 10

100 parts, by weight, of polycaprolactam (average molecular weight $\overline{M}_n=20,000$) are stirred at 230° C. with 18 parts, by weight, of the cyanate prepolymer of Example 1, followed by hardening for 2 hours at 250° C. After cooling, a compound material is obtained which shows dimensional stability, even at 300° C.

We claim:
1. A thermosetting resin which comprises:
   (a) at least one polycyanate and
   (b) from 1 to 40%, by weight, based on (a), of at least one polyester having a hydroxyl number of from 28 to 320, a number average molecular weight $\overline{M}_n$ of from 700 to 8000 and containing from 50 to 92%, by weight, of alcohol residues, acid residues, or both with each of said residues containing cycloaliphatic moieites.
2. A resin as claimed in claim 1 wherein from 5 to 20%, by weight, based on (a), of (b) is present.
3. A resin as claimed in claim 1 or claim 2 wherein $\overline{M}_n$ of (b) is from 800 to 4000 and its hydroxyl number is of from 28 to 140.
4. A thermosetting resin according to claim 1 wherein at least a portion of (b) is in the form of a prepolymer of (a) and (b).
5. Shaped article of manufacture fabricated from a cured thermoplastic resin according to claim 1 or 2.
6. A resin as claimed in claim 1 or 2 wherein (b) contains from 75 to 92%, by weight of alcohol residues containing cycloaliphatic moieties, acid residues containing cycloaliphatic moieties or a mixture of said residues.
7. A resin as claimed in claim 1 or 2 wherein (b) contains cycloaliphatic dimerized fatty alcohol residues, dimerized fatty acid residues or a mixture of said residues.

* * * * *